United States Patent Office 2,864,768 Patented Dec. 16, 1958

2,864,768

GERMICIDALLY ACTIVE SOAP CONTAINING REACTION PRODUCT OF SILVER SALT AND ETHYENETHIOUREA

Maynard M. Baldwin, Columbus, Ohio, assignor, by mesne assignments, to Permachem Corporation, Palm Beach, Fla., a corporation of Florida No Drawing. Application February 20, 1956
Serial No. 566,327

6 Claims. (Cl. 252—107)

This invention relates to germicidally active soaps and more particularly to soaps containing, as a germicide, a reaction product of a silver salt and a heterocyclic thiourea derivative.

Germicidal agents for use in soaps must possess a combination of properties which very few substances possess. In the first place, the germicide must be one which kills microorganisms on contact of very short duration. Another requirement for germicides for use in soaps is that they must not be harmful to human skin. Furthermore, the soap must not interfere with the germicidal action of the compound. A number of compounds which are effective germicides in other applications are ineffective as germicides in soap. Very few compounds have been found heretofore to have any noticeable effectiveness as germicides in soap, and none have been found to possess a high degree of effectiveness.

Various silver compounds have long been known to be effective bactericides in various applications. Silver compounds in general have been most effective in applications where the salt remained in contact with the material to be sterilized for a substantial period of time. Because a compound to be effective as a germicide in soap must kill organisms on very brief contact time, it is not surprising that silver compounds have been generally regarded as not being good germicides in soap.

According to the present invention it has been found that soaps containing a reaction product of a silver salt and a heterocyclic five- or six-member ring thiourea derivative are effective in killing skin bacteria. The heterocyclic thiourea derivative may be either ethylenethiourea, trimethylenethiourea, or a lower alkyl-substituted derivative thereof.

The complex reaction products of silver salts and ethylenethiourea are preferred germicides according to this invention. Ethylenethiourea is a heterocyclic compound having the formula:

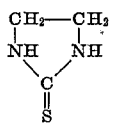

A large number of silver salts form complex compounds with ethylenethiourea which are suitable germicides in soap. The preferred soap germicides according to this invention are the reaction products of the insoluble silver halides, i. e., silver chloride, bromide, or iodide, with ethylenethiourea. The complex reaction product of silver bromide and ethylenethiourea is reported as having the following formula:

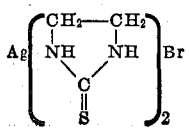

and the complex reaction product of silver iodide and ethylenethiourea is reported as having the following formula:

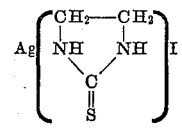

The complex reaction product of silver chloride and ethylenethiourea is reported by Morgan and Burstall, Journal of the Chemical Society (London), volume 131, page 151 (1928), as having the formula,

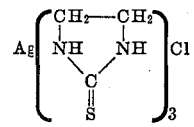

According to this invention it has been found that this compound is outstanding effective as a bactericide when incorporated in ordinary soap. In fact, the germicidal activity of this compound in soap is noticeably greater than that of 2,2′-methylenedbis(3,4,6-trichlorophenol), which is widely used as a soap germicide.

The reaction products of silver salts and certain other heterocyclic thiourea derivatives are also germicidally active. In general, heterocyclic five- and six-member ring compounds having the general formula

wherein $R_1$ is either hydrogen or an alkyl radical containing 1 to 4 carbon atoms, $R_2$, $R_3$, $R_4$, and $R_5$ are each hydrogen atoms or methyl radicals, and $R_6$ is either a linking bond or a —$CH_2$— radical, form germicidally active complex silver salts. The heterocyclic compounds in the above formula, it will be noted, are ethylenethiourea, trimethylenethiourea, and their lower alkyl-substituted derivatives. Trimethylenethiourea is denoted by the above formula when $R_1$, $R_2$, $R_3$, $R_4$, and $R_5$ are each hydrogen atoms and $R_6$ is a methylene (—$CH_2$—) radical. Ethylenethiourea and its alkyl-substituted derivatives in general are more readily available than trimethylenethiourea and its alkyl-substituted derivatives, and are therefore preferred for forming the complex silver salt germicides of this invention. These preferred compounds may be represented by the general formula

where $R_1$ is either hydrogen or an alkyl radical containing 1 to 4 carbon atoms, and $R_2$, $R_3$, $R_4$, and $R_5$ are each either hydrogen or the methyl radical.

The germicidal effectiveness of the reaction products of silver salts with the aforesaid heterocyclic thiourea derivatives is unexpected in view of the fact that reaction products of silver chloride with acyclic thiourea derivatives have been found to have little or no germicidal activity in soap. Some of these inactive thiourea derivatives are 1,1-dimethylthiourea and 1,1-diethylthiourea.

The germicides according to the present invention kill a large number of different types of bacteria, even when incorporated in relatively small amounts in soap. These compounds, when incorporated in soaps at a concentration of about 500 parts per million of silver are very rapid in their action against bacteria. The silver concentration in soaps may be considerably lower than this, for example, as low as 100 parts per million of silver or even lower. Higher concentrations than 500 parts per million of silver may be incorporated in soap. In general these higher concentrations are unnecessary, as the germicides are highly effective in concentrations of 500 parts per million in soap.

The complex compounds of the silver salts and the heterocyclic thiourea derivatives can be prepared by reacting the desired heterocyclic thiourea derivative with the silver salt in aqueous solution. For example, to prepare the reaction product of ethylene thiourea and silver chloride, 3 moles of ethylenthiourea are reacted with 1 mole of silver chloride. Procedures for preparing compounds of this type are described in an article by Morgan and Burstall in Journal of the Chemical Society (London), 1928, pages 143 to 155. Elevated temperatures facilitate the reaction. The complex reaction product crystallizes from aqueous solution by concentration or cooling.

The complex silver compounds which are used in soap germicides of the present invention may be incorporated in any of the conventional fatty acid soaps. These soaps may be in the form of bar soap for hand or bath use, soap powders, shaving cream, or liquid soap.

The major constituent of soaps according to the present invention is a conventional fatty acid soap, that is, an alkali metal soap of one or more of the fatty acids such as lauric acid, stearic acid, palmitic acid, or oleic acid. A mild soap having a pH of about 7 to 10 is particularly desirable as a soap base. Soaps containing the silver complex according to this invention have substantially the same mildness as the soap base.

The silver compound may be incorporated in soap by conventional methods, during crutching or milling for example. Soap may be mixed with the silver compound to be incorporated and a limited amount of water, and the resulting mix agitated to form a paste. The soap in paste form may be then formed into a large piece or slab and cut into bars. Where a soap in paste form, such as a shaving cream, is desired, it is necessary only to mix the ingredients in the desired proportions.

Soaps prepared according to the present invention have been found to kill skin bacteria rapidly in the course of ordinary washing. Soaps according to this invention were found to kill bacteria at a considerably more rapid rate in actual hand washing tests than a mild soap used as a control. The soaps according to the present invention used for testing differed from the control only in the presence of a germicidally active silver salt. Soaps according to this invention were also found to kill bacteria considerably faster than a commercially available soap containing 2,2' - methylenebis(3,4,6 - trichlorophenol), which was tested for comparision. The hand washing technique used in the test described in the example was that described by Pohle and Stuart in Journal of Infectious Diseases, volume 67, page 275 (1940).

The amount of silver necessary for germicidal effect was found to be quite low. A washing with soap containing silver chloride-ethylenethiourea complex was found to reduce the bacterial count on a person's skin by as much as 55 percent, with an average silver consumption of only about 0.001 milligram per square inch of skin washed.

The invention will now be further described with reference to a specific example thereof.

*Example*

A silver chloride-ethylenethiourea complex was prepared according to the method described in an article by Morgan and Burstall, Journal of the Chemical Society (London), pages 143–155 (1928), at page 151. A freshly prepared quantity of silver chloride weighing 1.4 grams was dissolved in an aqueous solution containing 3.0 grams of ethylenethiourea. The solution was heated and filtered hot. A small amount of silver chloride remained in the residue. The filtrate was concentrated by evaporation of water. A complex compound of silver chloride and ethylenethiourea crystallized as a mass of white needles from the hot solution.

One hundred grams of a white granular soap and 420 milligrams of silver chloride-ethylenethiourea complex prepared as described above were dry mixed in a Waring Blendor. The mixture was blended until it started to dust. Then an additional 100 grams of the white granular soap were added and blended thoroughly. Blending was continued for several minutes. This reduced the soap to very fine particle size and thoroughly blended the silver compound with the soap. The dry blend was then transferred to the bowl of a household mixer. Then 250 milliliters of water were added and the mixture was blended to a thick, smooth paste. The paste was transferred to a 10 x 14-inch glass plate and formed into a cake 6 x 10 inches with a stainless steel spatula. The large cake was scored with the spatula into 20 cakes, each 1½ x 2 inches and approximately ½ inch thick. After air drying at room temperature for several hours, the cakes were separated and turned over. Drying was completed at room temperature.

The bacteriotoxicity of the soap was tested in handwashing tests by 13 persons. The persons used as test subjects were chosen at random and had widely varying bacterial counts on their hands. Each person moistened his hands and forearms up to a distance 14 inches above the tip of the middle finger on each hand for 25 seconds in a wash basin containing 2 liters of water. Then each person worked up a lather on the hands with a bar of soap prepared as described above in this example. This lathering took 25 seconds, and was followed by an additional 75 seconds of scrubbing over the entire test area. Each person then rinsed the lather from the test area in the wash basin for 20 seconds. Each person repeated this washing test for a total of 10 times in a separate wash basin each time before drying his hands.

A control soap containing no additives was made in the manner described above except for the omission of any silver compound. To compare the effectiveness of soaps of the present invention with an ordinary mild soap containing no bactericidal additives, the identical washing test was on a group of 16 persons selected at random, using the control soap. A third group, consisting of 20 persons, made the identical test on a commercial soap containing 2,2'-methylenebis(3,4,6-trichlorophenol).

Samples were taken from each wash basin to determine the bacterial count. The average bacterial count after each of the 10 washings was obtained for both the test soap containing silver and the control soaps. The average microbe count after each of the 10 washings, in number of microorganisms in 0.1 milliliter, and the percentage reduction in bacterial count in each washing compared to the preceding washing, are given in the table below for the test soap containing silver chloride-ethylenethiourea complex and for the control soaps.

SOAP CONTAINING SILVER CHLORIDE-ETHYLENETHIOUREA COMPLEX

| Number of Washings | Microbe Count (microbes in 0.1 ml) | Percent Reduction from Previous Basin |
| --- | --- | --- |
| 1 | 300.3 | |
| 2 | 136.5 | 55 |
| 3 | 73.5 | 46 |
| 4 | 46.3 | 37 |
| 5 | 36.3 | 22 |
| 6 | 25.8 | 29 |
| 7 | 22.8 | 12 |
| 8 | 20.2 | 11 |
| 9 | 32.0 | −58 |
| 10 | 37.0 | −15 |

CONTROL SOAP (NO ADDITIVE)

| | | |
|---|---|---|
| 1 | 333.3 | |
| 2 | 257.3 | 23 |
| 3 | 226.3 | 12 |
| 4 | 166.1 | 27 |
| 5 | 131.2 | 21 |
| 6 | 101.4 | 23 |
| 7 | 82.7 | 19 |
| 8 | 114.7 | −39 |
| 9 | 96.2 | 16 |
| 10 | 72.2 | 25 |

COMMERCIAL SOAP CONTAINING
2,2'-METHYLENEBIS(3,4,6-TRICHLOROPHENOL)

| | | |
|---|---|---|
| 1 | 232.8 | |
| 2 | 168.3 | 28 |
| 3 | 157.3 | 7 |
| 4 | 104.4 | 34 |
| 5 | 83.7 | 20 |
| 6 | 64.2 | 23 |
| 7 | 56.6 | 12 |
| 8 | 43.2 | 24 |
| 9 | 46.4 | −7 |
| 10 | 39.4 | 15 |

It is apparent from the table above that the soap containing silver chloride-ethylenethiourea complex according to this invention is considerably more effective against microbes than either an ordinary soap having no germicidal additive or a soap containing 2,2'-methylenebis-(3,4,6-trichlorophenol). At the end of five washings, persons using the soap according to this invention had an average microbe count only 28 percent as great as those using the control soap, and only 43 percent as great as those using the commercial germicidal soap. The average microbe count for persons using the soap of this invention was only 12 percent as great on the fifth washing as on the first. The corresponding figures for the control soap and the commercial soap are 39 percent and 36 percent, respectively.

While the present invention has been described with respect to specific embodiments thereof, it is understood that this description is by way of illustration and not limitation.

What is claimed is:

1. A germicidally active soap composition comprising a water-soluble, higher fatty acid soap and a germicidal amount of a reaction product of ethylenethiourea and a silver halide selected from the group consisting of silver chloride, silver bromide, and silver iodide, said reaction product of ethylenethiourea and silver chloride being characterized by a ratio of three moles of ethylenethiourea to one mole of the silver chloride, said reaction product of ethylenethiourea and silver bromide being characterized by a ratio of two moles of ethylenethiourea to one mole of the silver bromide, said reaction product of ethylenethiourea and silver iodide being characterized by a ratio of one mole of ethylenethiourea to one mole of the silver iodide.

2. A germicidally active soap composition comprising a water-soluble, higher fatty acid soap and a germicidal amount of a reaction product of silver chloride and ethylenethiourea, said reaction product being characterized by a ratio of three moles of ethylenethiourea to one mole of silver chloride.

3. A germicidally active soap composition comprising a water-soluble, higher fatty acid soap and a germicidal amount of a reaction product of a silver halide selected from the group consisting of silver chloride, silver bromide, and silver iodide and a heterocyclic compound selected from the group consisting of the five and six member ring compounds having the general formula

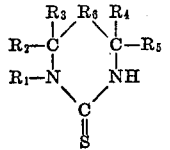

wherein $R_1$ is selected from the group consisting of hydrogen and alkyl radicals containing 1 to 4 carbon atoms, $R_2$, $R_3$, $R_4$, and $R_5$ are selected from the group consisting of hydrogen and the methyl radical, and $R_6$ is selected from the group consisting of a linking bond and the divalent —$CH_2$— radical, said reaction product of silver chloride and the heterocyclic compound being characterized by a ratio of three moles of the heterocyclic compound to one mole of the silver chloride, said reaction product of silver bromide and the heterocyclic compound being characterized by a ratio of two moles of the heterocyclic compound to one mole of the silver bromide, said reaction product of silver iodide and the heterocyclic compound being characterized by a ratio of one mole of the heterocyclic compound to one mole of the silver iodide.

4. A germicidally active soap composition comprising a water-soluble, higher fatty acid soap and a germicidal amount of a reaction product of silver chloride and a heterocyclic compound selected from the group consisting of the five and six member ring compounds having the general formula

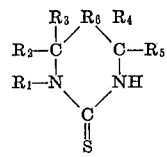

wherein $R_1$ is selected from the group consisting of hydrogen and alkyl radicals containing 1 to 4 carbon atoms, $R_2$, $R_3$, $R_4$, and $R_5$ are selected from the group consisting of hydrogen and the methyl radical, and $R_6$ is selected from the group consisting of a linking bond and the divalent —$CH_2$— radical, said reaction product being characterized by a ratio of three moles of the heterocyclic compound to one mole of silver chloride.

5. A germicidally active soap composition comprising a water-soluble, higher fatty acid soap and a germicidal amount of a reaction product of a silver halide selected from the group consisting of silver chloride, silver bromide, and silver iodide and a compound having the general formula $$R_2-\underset{\underset{R_1-N}{|}}{\overset{\overset{R_3}{|}}{C}}-\underset{\underset{NH}{}}{\overset{\overset{R_4}{|}}{C}}-R_5$$
$$\diagdown C \diagup$$
$$\parallel$$
$$S$$

wherein $R_1$ is selected from the group consisting of hydrogen and alkyl radicals containing from 1 to 4 carbon atoms, and $R_2$, $R_3$, $R_4$, and $R_5$ are selected from the group consisting of hydrogen and the methyl radical, said reaction product of silver chloride and the compound being characterized by a ratio of three moles of the compound to one mole of the silver chloride, said reaction product of silver bromide and the compound being characterized by a ratio of two moles of the compound to one mole of the silver bromide, said reaction product of silver iodide and the compound being characterized by a ratio of one mole of the compound to one mole of the silver iodide.

6. A germicidally active soap composition comprising a water-soluble, higher fatty acid soap and a germicidal amount of a reaction product of silver chloride and a compound having the general formula $$R_2-\underset{\underset{R_1-N}{|}}{\overset{\overset{R_3}{|}}{C}}-\underset{\underset{NH}{}}{\overset{\overset{R_4}{|}}{C}}-R_5$$
$$\diagdown C \diagup$$
$$\parallel$$
$$S$$

wherein $R_1$ is selected from the group consisting of hydrogen and alkyl radicals containing from 1 to 4 carbon atoms, and $R_2$, $R_3$, $R_4$, and $R_5$ are selected from the group consisting of hydrogen and the methyl radical, said reaction product being characterized by a ratio of three moles of the compound to one mole of silver chloride.

References Cited in the file of this patent

UNITED STATES PATENTS

| | | |
|---|---|---|
| 2,562,488 | Fuchs | July 31, 1951 |
| 2,577,700 | Croxall et al. | Dec. 4, 1951 |